United States Patent Office 3,512,070
Patented May 12, 1970

3,512,070
A.C.-D.C. MOTOR-DRIVEN APPARATUS
Bodo Futterer, Sarnen, and Hugo Fritschi, Sachseln,
Switzerland, assignors to The Gillette Company,
Boston, Mass., a corporation of Delaware
Filed Feb. 6, 1967, Ser. No. 614,101
Claims priority, application Germany, Feb. 7, 1966,
J 30,010
Int. Cl. H02j 7/00
U.S. Cl. 320—2          2 Claims

ABSTRACT OF THE DISCLOSURE

A circuit for selectively driving a motor from A.C. and D.C. power supplies by the use of a switch which simultaneously connects or disconnects the supplies to and from the motor and which is bridged by an indicator light, a rectifier circuit isolating the D.C. supply from the A.C. supply.

BACKGROUND OF THE INVENTION

Field of the invention

This invention relates to a circuit for selectively driving a motor from A.C. and D.C. power supplies, and more particularly to such a circuit for use with the motor of an electric shaver.

Description of the prior art

It is known practice to equip motor-driven shaving sets having a built-in storage battery with a connection for direct motor drive and for charging the battery, the connection being provided by a part connectable to the shaving set as an independent unit. With sets of this type, there is no possibility to find out if a charging process actually takes place.

It is customary simply to plug the connection part into a power outlet and to charge the storage battery of the set for a certain period, for instance overnight, whereupon the charged set can be put into use again. However, it happens occasionally that because of some defect the outlet is without voltage or there is a power cut-off in the set to be charged.

Moreover, there is the further disadvantage in known sets that switches with three switching positions are used with a special switch position for charging the storage battery. This is costly and requires greater attention in handling, especially as the charging process is not indicated.

SUMMARY OF THE INVENTION

An object of the invention is to avoid these disadvantages and to provide a control indicating whether a charging process actually takes place or not and which, in addition, simplifies handling.

The invention provides a motor-driven shaving set with a built-in storage battery and with line connection part for direct motor drive and for charging the storage battery. The above objects are achieved, while avoiding the afore-mentioned disadvantages, in that the current-limiting charge-indicating light source is so arranged in the charging circuit that the charging process takes place only when the charge-indicating light source is operative, the switch positions of the switch only two in number.

According to a special feature of the invention, provision is made that the light source is an incandescent bulb, is of resistance value, and is connected between rectifier and storage battery in series with the charging circuit such that it replaces wholly or partly the normally provided charging current limiting resistance. This way the essential advantage is achieved that no additional space is required.

The invention provides in particular that the motor-driven shaving set with built-in storage battery and with the line connection part for direct motor drive and for the charging of the storage battery is characterized by the following circuit conditions:

(a) A switch with two switch positions is provided which can switch the motor on and off when operated by storage battery as well as by power supply;

(b) During power supply operation and with the motor switched on, the motor is connected with the power supply through a rectifier, the storage battery being connected in parallel with the motor as a buffer;

(c) During power supply operation and with the motor switched off, the storage battery is so connected with the power supply through the rectifier and a current-limiting charge indicating light source that the charging process takes place only when the charge indication light source glows;

(d) When no charging process takes place, no discharge of the storage battery across the charge indication light source takes place.

DESCRIPTION OF THE PREFERRED EMBODIMENT

Figure 1:
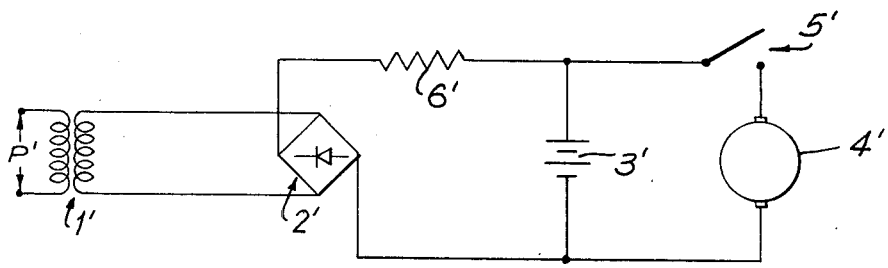
FIG. 1 is a schematic circuit diagram of a known motor-driven shaving set with a built-in storage battery and a connection for charging the battery.

In particular, the circuit arrangement is characterized by the following conditions:

In switched-on state the switch connects the motor with an A.C. power supply through a rectifier, the storage battery or D.C. power source being connected as a buffer in parallel with the motor. At this time the charge-indication light source connected in parallel with the switch is short-circuited. When the device is operated by the storage battery the rectifier prevents the short-circuiting of the battery across the closed switch. With the switch open, the battery with the charge-indication light is connected with the A.C. power supply via the rectified, charging taking place only when light is emitting. During operation by battery and with the switch open, the rectifier prevents the discharge of the battery through the light.

In the drawing, equivalent parts are provided with the same reference symbols which have a superscript corresponding with the related figure.

In FIG. 1, element $1^1$ is a transformer adapted to be connected to an A.C. power supply $P^1$, followed by a rectifier bridge $2^1$. Element $3^1$ is a chargeable storage battery or D.C. power source which serves to operate a motor 4 which is the drive motor of a shaving set (not shown). Element 5 is a switch by which, when opened, motor 4 can be disconnected from the battery 3. Element 6 is a current limiting resistance required for the recharging process.

Figure 2:
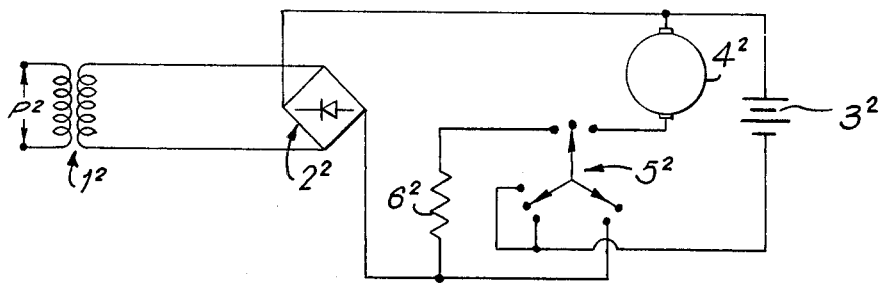
FIG. 2 is a schematic circuit diagram of a second known motor-driven shaving set with a built-in storage battery having a connection for a direct motor drive and for charging the storage battery.

In FIG. 2, element $1^2$ is a transformer to be connected to the A.C. power supply $P^2$, and to which is coupled a rectifier bridge $2^2$. In its right-hand position, switch $5^2$ connects motor $4^2$ with rectifier bridge $2^2$ and storage battery $3^2$. In the middle position of switch $5^2$ (as illustrated) all elements are disconnected. In its left position, switch $5^2$ connects storage battery $3^2$ with rectifier bridge $2^2$ via the current-limiting resistance $6^2$.

Figure 3:
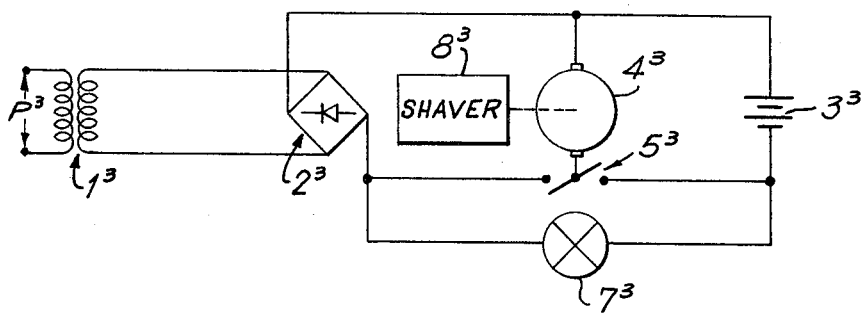
FIG. 3 is a schematic circuit diagram of a motor-driven shaving set, according to the invention, with a built-in storage battery and with a connection for a direct motor drive and for charging the storage battery, the circuit having a charge indicating light source connected in the charging circuit.

In FIG. 3 an example of construction of a device according to the invention is illustrated. Switch $5^3$, when switched-on, connects motor $4^3$ via rectifier bridge $2^3$, with the A.C. power supply $P^3$, storage battery or D.C. power source $3^3$ being connected in parallel with motor $4^3$ as a buffer.

In this situation, the charge indicating light source $7^3$ connected in parallel with switch $5^3$ is short-circuited. During operation by storage battery, rectifier bridge $2^3$ prevents the short-circuiting of storage battery $3^3$ via the closd switech $5^3$.

With switch $5^3$ open, storage battery $3^3$ with the charge-indicating light source $7^3$ is connected via rectifier bridge $2^3$ with the power supply $P^3$, charging taking place only when the charge indicating light source $7^3$ is operated.

During operation by the storage battery $3^3$ and with the switch $5^3$ open, rectifier bridge 2 prevents the discharge of storage battery $3^3$ via the charge indicating light source $7^3$.

As has been described, conditions are by far the most favorable in the arrangement of FIG. 3, functionally as well as with regard to handling.

The circuit according to FIG. 3 is the most favorable conceivable solution for the installation of a charge indicating device in electric shaver $8^3$, as it reliably indicates the charging process and moreover dispenses at least partly with the previously required resistance as an additional component. Therefore, in terms of space as well as cost, an appliance with a charging device and with the use of the indicating light source $7^3$ is provided which, compared with appliances without charge indication, results in no higher expense. A further advantage consists in that a switch with only two switch positions is required, permitting a particularly simple operation.

The circuit arrangement according to the invention is advantageously applicable in other appliances such as motor-driven toothbrushes, nail files, pocket radios and so forth.

Thus, according to the invention, there is provided a motor-driven shaving set with a built-in storage battery and with a line connection part for direct motor drive and for charging its storage battery, characterized by the following circuit conditions:

(a) A switch with two switch positions is provided which can switch the motor on and off when operated by a storage battery as well as by an A.C. power supply;

(b) During power supply operation and with the motor switched on, the motor is connected with the power supply through a rectifier, the storage battery being connected in parallel with the motor as a buffer;

(c) During power supply operation and with the motor switched off, the storage battery is so connected with the power supply through the rectifier and a current-limiting charge-indicating light source that the charging process takes place only when the charge-indicating light source operates;

(d) When no charging process takes place, no discharge of the storage battery across the charge-indicating light source takes place.

In the switched-on state, switch $5^3$ connects motor $4^3$ with the power supply $P^3$ through rectifier bridge $2^3$, storage battery $3^3$ being connected as a buffer in parallel with motor $4^3$. At this time, the charge-indicating light source $7^3$ which is parallel with switch $5^3$ is short-circuited.

When operated by storage battery, rectifier bridge $2^3$ blocks the short-circuiting of battery $3^3$ across the closed switch $5^3$.

With switch $5^3$ open, storage battery $3^3$ with the charge-indicating light source $7^3$ is connected with the power supply via rectifier bridge $2^3$, charging taking place only when the charge-indicating light source $7^3$ glows.

During operation by the storage battery and with switch $5^3$ open, rectifier bridge $2^3$ prevents the discharge of storage battery 3 across the charge indicating light source $7^3$.

What is claimed is:

1. Apparatus for selective use with an external power supply comprising:
   (A) an electric motor, with first and second terminals,
   (B) rectifier means, with first and second terminals,
   (C) a D.C. power source, with first and second terminals,
   (D) a common connection between the first terminals of said motor, said rectifier means and said D.C. power source,
   (E) two-position switching means for selectively either making a simultaneous electrical connection between all of said second terminals or simultaneously breaking the electrical connection between each of said second terminals, and
   (F) a signal lamp directly connected between the second terminals of said rectifier means and said D.C. power source and bypassing said switch means.

2. Apparatus according to claim 1 further comprising shaver means adapted to be driven by said electric motor.

References Cited

UNITED STATES PATENTS

| | | | |
|---|---|---|---|
| 3,290,484 | 12/1966 | Day | 320—2 |
| 3,329,881 | 7/1967 | Tolmie | 310—50 |
| 3,344,899 | 10/1967 | Wang | 320—2 |
| 3,214,670 | 10/1965 | Schaf | 320—48 |
| 3,217,311 | 11/1965 | Custer et al. | 320—48 |
| 3,327,198 | 6/1967 | Rauch | 320—48 |
| 3,370,214 | 2/1968 | Aymar | 320—2 |

ORIS L. RADER, Primary Examiner

K. L. CROSSON, Assistant Examiner

U.S. Cl. X.R.

318—17, 441; 320—57